United States Patent Office 3,354,548
Patented Nov. 28, 1967

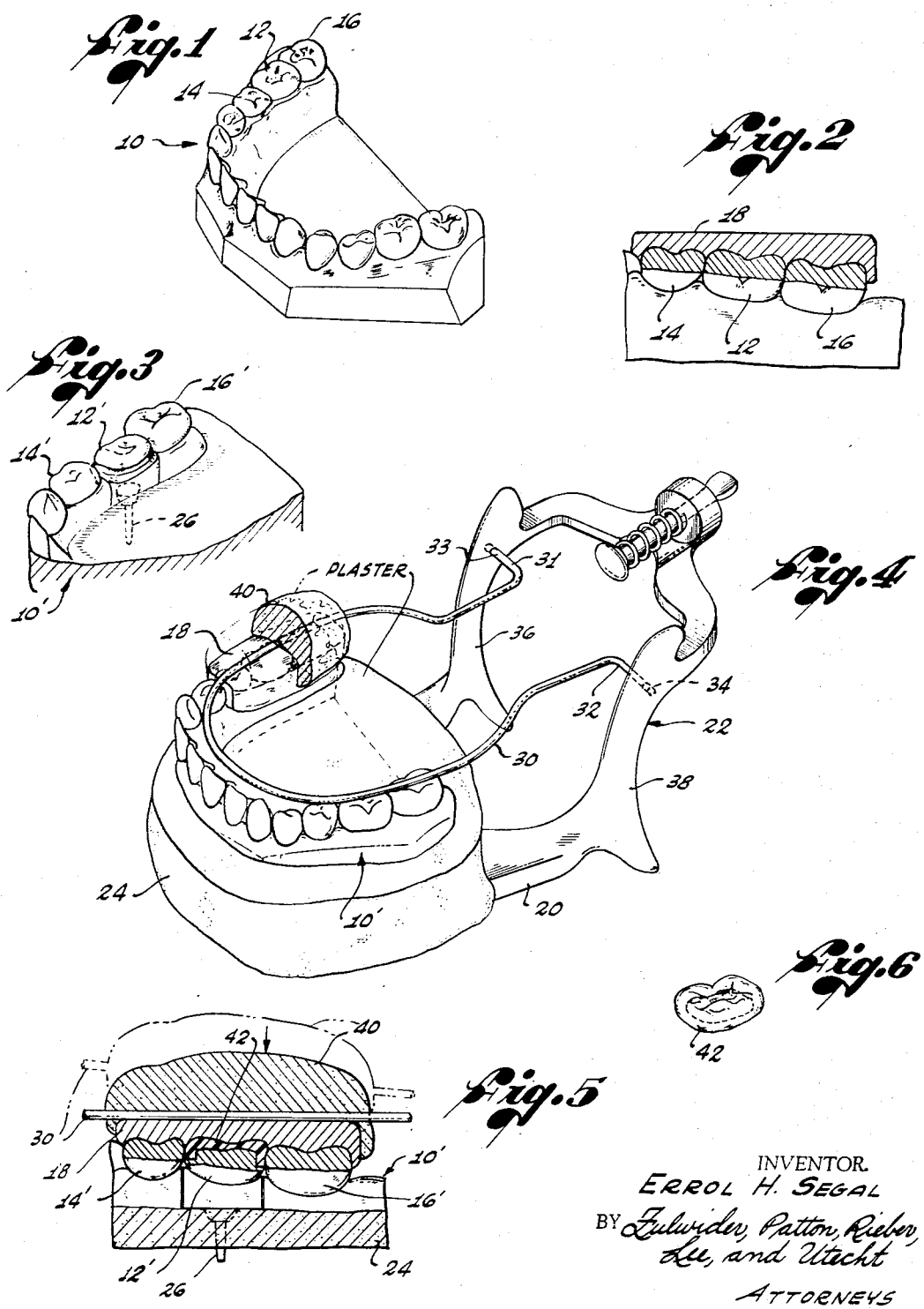

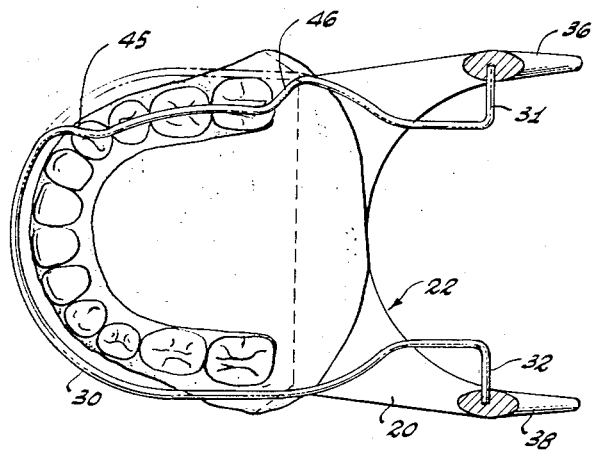
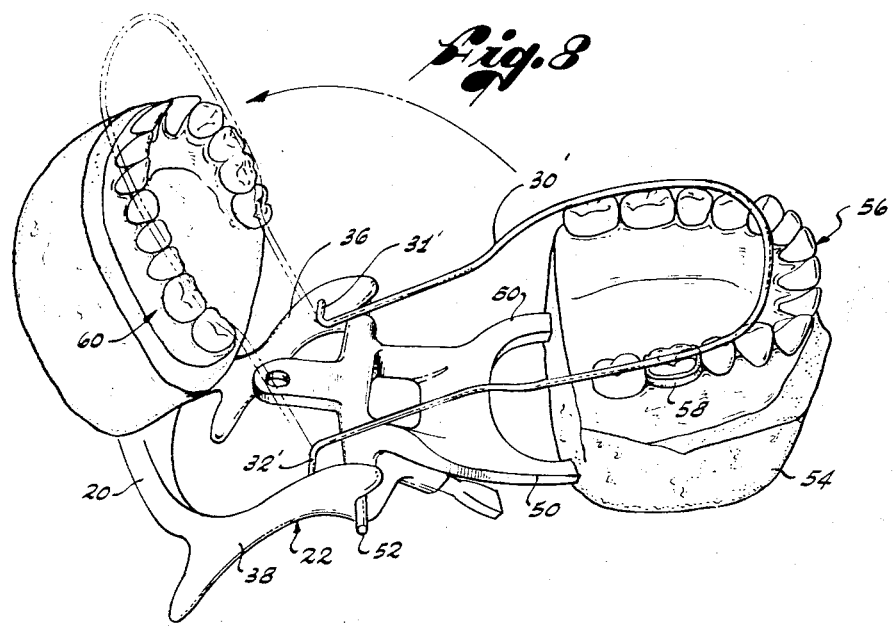
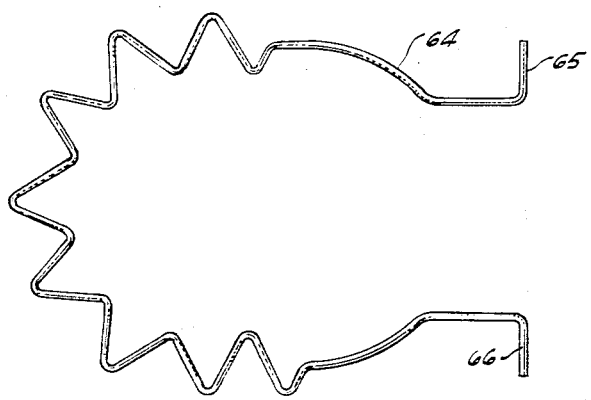

3,354,548
APPARATUS FOR MAKING DENTAL
CROWNS AND BRIDGES
Errol H. Segal, 1772 S. Corning St.,
Los Angeles, Calif. 90035
Filed Mar. 21, 1967, Ser. No. 624,851
6 Claims. (Cl. 32—32)

ABSTRACT OF THE DISCLOSURE

From a model of a patient's original teeth, a matrix is made of a tooth to be crowned, and of the teeth adjacent thereto. A novel attachment is removably attached to an articulator, and the matrix is secured thereto. The matrix is placed over the corresponding teeth of a model which is made after such tooth is prepared and which is mounted on the articulator. Wax is placed on the model of such prepared tooth. The attachment is then pressed to force the matrix against the wax, thereby automatically forming the original occlusal surface in the wax, from which a filling is cast.

Background of the invention (1) Field of the invention.—The invention relates to dental articulators, and more particularly to novel method and means for making crowns and bridges therefrom.

(2) Description of the prior art.—As presently known, elaborate and time consuming procedures are followed in making crowns and bridges. Nevertheless, such techniques fail to produce a crown having an exact replica of the occlusal surface of the tooth for which it is made. In this connection, the practice is to make models of the upper and lower teeth, before doing any work on the patient. Next, the dentist prepares the tooth or teeth to be crowned, and then a new model is made. For example, if a tooth to be crowned is a bottom molar, a model is made of the mandibular teeth.

The model of the maxillary teeth, and the model of the mandible with the prepared tooth, are attached to an articulator, and heated wax is applied to the prepared tooth of the mandible model. The wax is applied to a height at least as great as that of the adjoining teeth, and then the articulator is manipulated to obtain a bite. Thereafter, following solidification of the wax, the articulator is opened. Then follows a painstaking carving procedure in which it is attempted to form on the wax a replica of the occlusal surface of the patient's original tooth.

Such carving can best be done only by highly skilled persons of extended experience in such work, and having an artistic talent not unlike that of a sculptor. Nevertheless, even with the best experience and talent, one is unable to reproduce the occlusal surface exactly in the wax. Furthermore, the time required for an experienced and talented person to do this work for a single crown is in excess of half an hour, and normally takes 30–45 minutes.

Following this effort, the sides of the wax pattern are trimmed—which takes only two or three minutes—after which the margins of the pattern are sealed. Then the wax pattern is "invested." A mold is formed from the pattern, the wax is burned out of the mold, and inlay material is cast in the mold. Finally, the inlay is removed from the mold and fitted on the prepared tooth in the patient's mouth. Unfortunately, and despite all the elaborate procedures and time devoted to make it, the inlay almost never has an occlusal surface that conforms exactly to that of the patient's original tooth, and therefore does not permit the patient to enjoy natural and comfortable occlusion as experienced with his original tooth.

Summary of the invention

By the use of a disposable implement adapted to be removably attached to an articulator, inlays for crowns and bridges can be made with occlusal surfaces exactly duplicating those of the original teeth, and in only a fraction of the time heretofore required. The invention facilitates high volume production of inlays for crowns and bridges, together with optimum accuracy not heretofore possible with low volume production and time-consuming techniques of the prior art. The invention eliminates the need for carving occlusal surfaces on wax patterns, and permits highly accurate inlays for crowns and bridges to be made quickly by relatively unskilled persons.

Brief description of the drawing

FIGURE 1 is a perspective view of a model made of the lower teeth of a patient before the dentist has prepared a tooth thereof for which a crown is to be made;

FIGURE 2 is an enlarged, fragmentary sectional view of the molar portion of the model of FIGURE 1, to aid in explaining the formation of the matrix corresponding to the original teeth;

FIGURE 3 is an enlarged fragmentary perspective view of a model like FIGURE 1, which is made after a molar has been prepared, such view showing the molars corresponding to those of FIGURE 2 from which the matrix is made;

FIGURE 4 is a perspective view of an articulator supporting the model of FIGURE 3, and showing a disposable wire attachment which is spring-mounted for pivotal movement on the articulator uprights, and to which the matrix is secured after being placed on the corresponding teeth of the model;

FIGURE 5 is an enlarged sectional view taken along the line 5—5 of FIGURE 4, showing the matrix pressed against the corresponding teeth of the model, for forming the original occlusal surface of the prepared tooth onto dental wax that has been placed on top of the corresponding tooth of the model;

FIGURE 6 is a perspective view of the wax pattern formed in the operation illustrated in FIGURE 5;

FIGURE 7 is a top plan view of the articulator using a wire attachment that normally passes outside the teeth of the model, and illustrating the wire deformed so that a portion of it is properly positioned over the teeth of the model with which the matrix is to cooperate;

FIGURE 8 is a perspective view of a complete articulator arranged to permit the similar formation of an inlay for a maxillary tooth, and showing the use of a wire attachment that is adapted to be positioned for use in making such an inlay for either a maxillary tooth or a mandible tooth; and FIGURE 9 is a plan view of a modified wire attachment with a configuration that insures some portion thereof being in alignment with molars and bicuspids of models of various sizes.

Description of the illustrative embodiments

FIGURE 1 illustrates a model 10 of the lower teeth, made in conventional fashion, and which is a replica of the patient's lower teeth before the dentist has done any work. By way of example, the first right molar 12 corresponds to the same tooth for which a crown is to be made.

The tooth 12, and the teeth 14, 16 between which it is located, are utilized to make a matrix. In this connection, and referring to FIGURE 2, a stone matrix 18 is cast on the teeth 12, 14, 16. The matrix 18, which may be made of any dental stone of good quality, is formed in conventional fashion, as by mixing matrix material to form a suitable paste, placing the paste over the teeth 12, 14, 16 and vibrating it to get rid of air bubbles. As is apparent, the resultant hardened material is a matrix 18 in which the female impressions are faithful negatives of the upper parts of the teeth 12, 14, 16.

After the dentist prepares the patient's tooth which is to be crowned, a second model 10' is made (see FIGURE 3). The teeth 12', 14', 16' correspond to the teeth 12, 14, 16 in FIGURES 1 and 2. The teeth 14', 16' are exact duplicates of the teeth 14, 16. However, the tooth 12', which is cast from the prepared tooth, is smaller than the tooth 12 by an amount corresponding to the material removed from the original tooth of the patient. Referring to FIGURE 4, the model 10' is mounted on the mandible supports 20 of an articulator 22, as on a plaster of Paris base 24 that is cast on the supports 20 in conventional fashion. Also, in a conventional manner, the model 10' is cut on either side of the tooth 12', so that the tooth 12' is removable from the model 10'. A dowel pin 26 (see FIGURE 3) is embedded in the bottom of the portion of the model 10' that is thus made removable, and extends into an opening in the plaster base 24.

Referring to FIGURE 4, I provide a removable attachment 30, which in the form shown is a generally U-shaped wire wherein its legs have their ends 31, 32 bent outwardly. Coaxially aligned openings 33, 34 are formed in the inner surfaces of the uprights 36, 38 of the articulator 22. The distance between the extremities of the bent ends 31, 32 is greater than the distance between the inner ends of the openings 33, 34. The portions of the bent ends 31, 32 adjacent their extremities are inserted in the openings 33, 34, by pressing the legs toward each other to permit the ends 31, 32 to pass between the uprights, and moving the wire to a position where the extremities of the bent ends are adjacent the openings 33, 34. Then the legs of the wire are released, permitting the extremities of the bent ends to spring outwardly and into the openings 33, 34, whereby the wire 30 is supported for pivotal movement. Preferably the bent ends 31, 32 are so formed that they are coaxial when their extremities are in the associated openings.

As shown, the closed end of the wire attachment 30 extends over the model 10'. Preferably, the wire is so shaped that portions thereof pass over the occlusal teeth, i.e., from the bicuspids to the second molars.

With the attachment 30 located on the articulator as described, it is lifted upwardly and the matrix 18 is placed over the teeth 12', 14', 16'. However, inasmuch as the tooth 12' was cast from the prepared tooth, there is a gap between the upper end of the tooth 12' and the confronting surface portions of the impression in the matrix 18.

After the matrix 18 is thus positioned, the attachment 30 is lowered, permitting the portion thereof that overlays the teeth 12', 14', 16' to come to rest on the upper surface of the matrix 18. Thereupon, I secure the matrix to the attachment by casting a body 40 of plaster of Paris over both.

After thus securing the matrix to the attachment 30, the attachment is again raised (carrying the matrix with it), and heated wax is placed on the upper end of the tooth 12', to the level of the adjoining teeth. Thereupon, and referring to FIGURE 5 along with FIGURE 4, the attachment is lowered and pressure is applied to the upper surface of the plaster body 40, as by pressing downwardly with a finger. Such pressure forces the wax to conform to the interior of the impression in the matrix that was formed with the tooth 12 of FIGURE 2, i.e., a wax pattern 42 is molded so that its upper surface anatomy conforms exactly to the anatomy of occlusal surface of the patient's original tooth. In this connection, the operator can readily see, when applying such pressure, that the bite is closed.

After thus molding the wax 42, the wire 30 is lifted to carry the matrix 18 away from the teeth 12', 14', 16', and leaving the wax 42 on the tooth 12'. In this latter connection, the interior surfaces of the matrix 18 may be coated with a thin film of lubricant, to permit it to be forced downwardly, and then lifted clear of the teeth and wax without sticking.

The entire procedure above described, starting with the positioning of the wire for pivotal movement on the uprights 36, 38, and through the molding of the wax pattern 42, can be accomplished in a matter of about three minutes by a relatively unskilled operator. Nevertheless, the wax pattern 42 has an upper surface anatomy that conforms precisely to that of the patient's original tooth. No carving at all is needed for this purpose. Rather, only side trimming is needed. In this connection, upon removal of the matrix, the tooth 12', with the wax pattern 42 thereon, is lifted out of the model 10', and the operator trims the sides and ends of the wax to the same extent as in the prior art technique. Such trimming can be accomplished in a couple of minutes. Thus, the entire procedure to complete a wax pattern, with a perfectly matched occlusal surface, takes no more than about five minutes—upwards of one-tenth the time needed to form an inexact wax replica by the prior art process.

Not only is the wax pattern 42 (FIGURE 6) one that has an upper surface matching exactly the occlusal surface of the patient's original tooth, but its inner surface matches exactly the outer contour of the tooth 12', i.e., the outer contour of the patient's prepared tooth. The wax element is then invested in the normal manner and is used to form a mold for casting the inlay. Such inlay is applied to the patient's prepared tooth in the conventional manner. With such an inlay, only a bare minimum of polishing is needed, if at all.

Because the models 10, 10' will vary in size, depending upon variations in the sizes of mouths of different patients, attachments as above described may be provided in different sizes, e.g., one size for the average mouth, one for the smaller than average mouth, and one for the larger than average mouth. However, a wire attachment of my invention in a single size can be utilized with a matrix end to the model for a mouth of any size. For example, and referring to FIGURE 7, the attachment 30 in its original form is shown to be too large, in that the wire passes outside the buccal surfaces of the teeth for which it may be desired to form a crown. However, by making the wire deformable, it is necessary only to bend it, as at 45, 46, to insure the desired teeth are overlayed by a portion of the wire to which the matrix is to be secured. In similar fashion, of course, the wire can be deformed as needed for a model in which the teeth in question lay outside the wire loop. In all cases, such deformation is effected while the bent ends 31, 32 of the wire are in pivotal engagement with the uprights 36, 38 and the bending is carried out without forcing the bent ends out of alignment.

FIGURE 8 shows the use of the wire attachment of my invention for making a crown in a tooth in the maxillary arch. In this case, the articulator 22 is shown with maxillary supports 50 pivotally mounted at 52 on the upper ends of the uprights 36, 38. The maxillary supports 50 carry a plaster base 54 on which is mounted a model 56 of the patient's upper teeth, one molar 58 of which is shown as a model of a prepared tooth. The attachment 30' in this instance is substantially longer than the one shown in FIGURES 4 and 5, i.e., a wire made solely for use in forming a crown for a mandible tooth is not sufficiently long to accomplish the same purpose for a maxillary tooth with this type of articulator. On the other hand, the attachment 30' is suitable for use in making a crown for either a mandible or a maxillary tooth. As shown in phantom in FIGURE 8, the attachment 30' is sufficiently long that the closed end thereof extends well beyond the front end of the model 60 of the mandible teeth. However, whereas the portion of the wire nearer the closed end passes over the molars and bicuspids of the maxillary model 56', the portions of the legs nearer the ends 31', 32' pass over the molars and bicuspids of the mandible model 60. In either case, the attachment 30' readily permits a matrix to be secured thereto, and facilitates carrying out the method of my invention for making crowns and bridges for either or both upper and lower teeth.

FIGURE 9 shows another embodiment of a wire loop of my invention, which is shaped to insure that portions thereof pass over the molars and bicuspids of teeth of models of different sizes. In this connection, there is shown a wire attachment 64 having ends 65, 66 bent like those of the attachments 30, 30' previously described. However, the loop of the attachment 64 is made generally serpentine. This serpentine section is dimensioned so that its inner portions pass over the molars and bicuspids of models of teeth made from small mouths; its outer portions pass over the molars and bicuspids of models of teeth made from relatively large mouths; and the center portions pass over the molars and bicuspids of models of teeth made from mouths that vary between such extremes. In all such cases, there is sufficient metal passing over the bicuspids and molars to insure ample contact of the attachment with a matrix to permit the matrix to be secured to the attachment.

As is apparent, attachments in accordance with my invention are extremely simple and inexpensive to make and to mount on and remove from an articulator. It is easiest and cheapest to use a new attachment for each crown, bridge, etc. to be made. Because of such low expense, a dentist can retain matrices on such attachments for a period of time, and dispose of them after they are no longer needed.

In the foregoing description, the matrix is described as spanning three teeth, the center one being that for which the wax impression is made. As indicated, this permits quick visual inspection, when pressing the matrix against the wax, to make sure that the bite is closed. In this connection, if the most posterior tooth is the model of the tooth to be crowned, the matrix is cast only on the models of the last two posterior teeth. In such case, since the model when poured has a heel portion, the matrix preferably is made to extend along the distal surface of the model and down onto the heel. Thus, when the matrix is positioned on the model with the postive of the prepared tooth, such portion of the matrix is supported on the heel and the tooth adjacent the prepared tooth. Thus, when pressing against the wax in this example, again one is able to tell by quick visual inspection that the bite is closed.

It will now be seen that the attachment and process of my invention are used in the same manner in making bridges. The matrix is formed to span whatever number of teeth are involved, and all wax impressions needed are formed simultaneously. A considerable saving in time, effort and expense is apparent in so making the wax impressions, to the end that the patient is fitted with a bridge in less time than has heretofore been possible, and wherein all occlusal surfaces accurately match those of the patient's original teeth.

Other uses for the attachment and process of my invention will now also be apparent. Partial crowns are made in the same way as already described for full crowns. Also, the same attachment and process are useful for making crowns, bridges, jackets, etc., of a variety of materials, including metal and porcelain.

The matrix holder of my invention will be recognized as suitable for use on various types of articulators. For example, some articulators are made in which one model is operated by a linear actuator, e.g., as the jaw of a vise. Obviously, my attachment can also be easily attached to and carried by such an actuator. Still further, my invention also embraces the use of different materials for the wire element, e.g., metal or plastic.

From the foregoing, it will be apparent that various modifications can be made in the wire attachments shown and described without departing from the spirit and scope of my invention, and with which to carry out the method of my invention. Accordingly, I do not intend that my invention be limited, except as by the appended claims.

I claim:
1. Articulator apparatus comprising:
lower and upper support members for supporting models of the respective lower and upper arches of the teeth of a patient, said lower support member being adapted to support the lower arch so that it is substantially horizontal, said lower support member having spaced uprights, the upper support member being supported on the upper ends of said uprights for pivotal movement on a horizontal axis;
a generally U-shaped wire element having leg portions spaced apart substantially the distance between the posterior teeth of models of arches to be supported on a support member;
and means removably attaching the ends of said leg portions to opposed portions of said uprights for pivotal movement on an axis parallel to and below the axis of movement of said upper support member, said wire element being adapted to support a matrix for forming a wax pattern on a model on either support member, and removable to permit the upper support member to be articulated to bring upper and lower models on the support members together.

2. The combination of claim 1, wherein said uprights have horizontally aligned openings in confronting surfaces thereof, and wherein the ends of said leg portions of said wire element extend between the uprights and are bent outwardly to extend into said openings.

3. The combination of claim 2, wherein said leg portions of said wire element are generally serpentine.

4. In combination:
an articulator having a base section on which a model of an arch of a patient is mounted, the base section having a pair of spaced uprights, the uprights being adapted to pivotally support on their ends an upper section on which a model of an opposing arch of the patient is mounted, the uprights having horizontally aligned openings in confronting surface portions below the ends thereof, and wherein a matrix of a posterior portion of the patient's teeth is to be placed on the corresponding portion of a model,
an elongated element bent so as to be generally U-shaped, the ends of the legs of said element being bent to extend in opposite directions,
said element having a characteristic spring action when its legs are moved relative to each other, said ends being non-coaxial when the legs are not stressed but are coaxial when said legs are moved and are a predetermined distance apart,
said ends extending into the openings in the uprights to permit pivotal movement of the element toward and away from an arch model on either the base section or upper section,
and said element having portions spaced apart approximately the distance between the posterior portions of an arch model, one of said element portions being adapted to engage a matrix placed on a posterior portion of the model and permit the matrix to be connected thereto.

5. The combination of claim 4, wherein said spaced apart portions of said element are generally serpentine.

6. The combination of claim 4, wherein said element is characterized in that said spaced apart portions thereof are deformable by hand.

References Cited

UNITED STATES PATENTS 3,031,759   5/1962   Heintz et al. _____ 32—32

FOREIGN PATENTS 38,756   5/1956   Poland.
45,116   10/1963   Poland.
340,580   10/1959   Switzerland.

RICHARD A. GAUDET, *Primary Examiner.*

J. W. HINEY, *Assistant Examiner.*